G. E. WARING.
Cooking Stove.
No. 6,177.
Patented March 13, 1849.
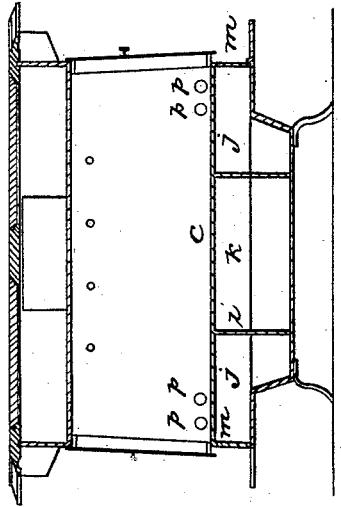
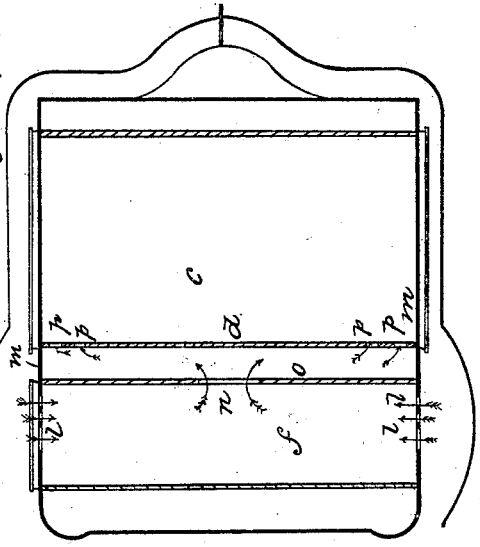
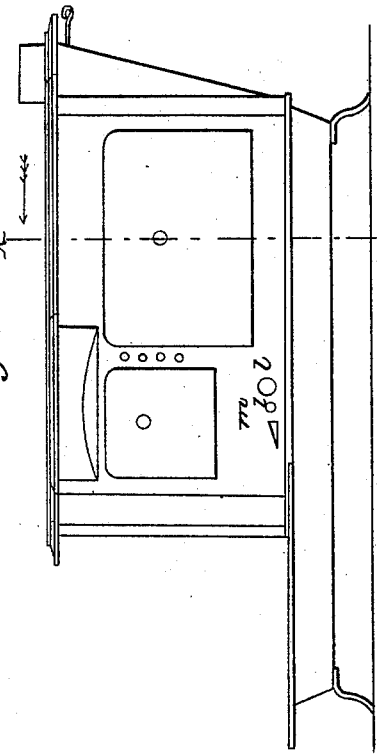
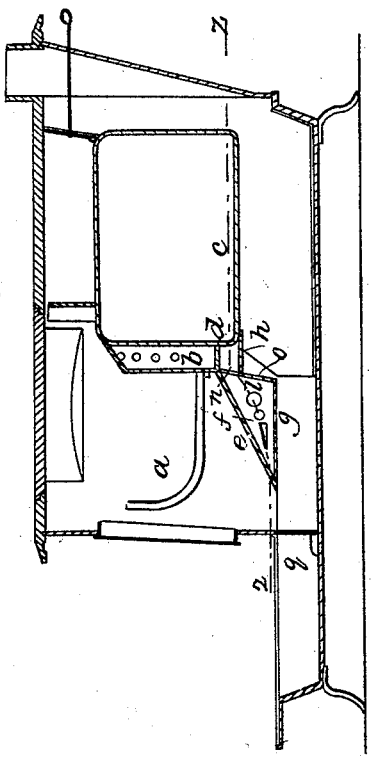

UNITED STATES PATENT OFFICE.

GEO. E. WARING, OF STAMFORD, CONNECTICUT.

COOKING-STOVE.

Specification of Letters Patent No. 6,177, dated March 13, 1849.

*To all whom it may concern:*

Be it known that I, GEORGE E. WARING, of Stamford, in the county of Fairfield and State of Connecticut, have invented a new and useful Improvement in the Hot-Air-Rarefying Cooking-Stove, and that the following is a full, clear, and exact description of the principle or character which distinguishes it from all other things before known and of the manner of making, constructing, and using the same, reference being had to the accompanying drawings, making part of this specification, in which—

Figure 1 is a side elevation; Fig. 2, a longitudinal vertical section; Fig. 3, a cross vertical section taken at the line (X X), and looking in the direction of the arrow in Fig. 1; and Fig. 4, an inverted horizontal section at the line (Z, Z,) of Fig. 2.

The same letters indicate like parts in all the figures.

The improvement which I have made is on that class of stoves in which the oven is partly heated by currents of hot air passing from a hot air chamber and circulating through the oven, and my invention consists in extending the bottom oven plate under the grate to make it the top of the air chamber in which the air is heated that the said plate may be heated by radiation from the fire on the grate, and thus not only heat the air in the chamber below, but at the same time aid in heating the oven by the conducting properties of the said plate; and also in extending the flues that heat the bottom of the oven so far forward that the products of combustion, in passing around to enter the central return flue that leads to the exit pipe, may pass under the bottom plate of the hot air chamber, and thus aid in heating the air therein. And finally my invention consists in making the hot air chamber in two parts, the separating partition being provided with an aperture or apertures at or near the middle of its length, that the air which enters the hot air chamber at the sides of the stove shall be forced to pass to this central aperture or apertures before passing to the second compartment, and then pass along this compartment toward each side to enter the oven through apertures in the front plate of the oven and near the sides of the stove; without this arrangement or something essentially the same the cold air would enter the hot air chamber and pass directly into the oven without being heated by circulating through the hot air chamber.

In the accompanying drawings (*a*) represents the fire grate and (*b*) the hollow fire back made in manner well known to stove makers. The bottom plate (*c*) of the oven turns up at (*d*) to form part of the front of the oven, and then it runs down in an inclined plane (*e*) under the grate to form the top of the hot air chamber (*f*), the bottom plate (*g*) of which joins onto the top plate in front and runs back horizontally and then vertically to form the back of the hot air chamber. This plate is then formed with a horizontal flange (*h*) on which the oven bottom rests. The partitions (*i, i*) that form the two main flues (*j, j*) and the return flue (*k*) that heat the bottom of the oven extend to the back of the hot air chamber (*f*) that the products of combustion in passing around the ends of the partitions may pass under the bottom plate of the hot air chamber to aid in heating the hot air chamber, so that the air that enters this chamber through holes (*l*) in the side plates (*m*) of the stove is heated by the bottom flues as well as by the heat radiated from the fire. After the air is heated it passes out through a hole or holes (*n*) in a vertical partition (*o*) that divides the hot air chamber into two compartments, and thence the hot air passes in opposite directions to holes (*p, p*) into the oven, and after circulating through the oven escapes through holes either in the back or top plate of the oven into the flues in the usual manner of hot air rarifying stoves. The ashes that fall onto the top of the hot air chamber instead of remaining there to intercept the heat, slide down the inclined plane and are deposited in the front sunken hearth (*q*).

It will be obvious from the foregoing that the top plate of the hot air chamber may be curved if desired, so long as the curve is such as to permit the ashes to run down and leave the surface of the plate exposed to the radiated heat. And it will also be observed that the top plate of the hot air chamber may be made separate from the bottom plate of the oven and answer the purpose of heating the air equally well, but when so made it will not conduct the heat to the oven so well as when the two are made in one piece, and therefore the two parts of my invention may be applied separately.

I am aware that cooking stoves have heretofore been made with hot air chambers to heat air which is then to be carried through the oven to aid in baking, and therefore I do not claim this as of my invention, but what I do claim as my invention and desire to secure by Letters Patent is—

1. Extending the hot air chamber under the fire grate when the top plate thereof is so inclined or curved as to discharge the ashes that fall thereon from the grate that the said air chamber may be heated by radiation from the fire on the grate above, substantially as described.

2. I also claim making the hot air chamber in two compartments by a partition perforated at or near the middle of its length in combination with the perforations in the back plate of the back chamber or front of the oven and near the ends thereof, substantially as described, that the air which enters the chamber through holes in the sides of the stove may be forced to circulate through the hot air chamber to be heated before it enters the oven near the sides thereof, as described. And finally I claim in combination with the method herein described of heating the top of the hot air chamber, the extension of the bottom flues of the stove that the products of combustion in passing around to enter the return flue may pass under the bottom plate of the hot air chamber, and thus aid in heating the air therein, as described.

GEORGE E. WARING.

Witnesses:
DAVID F. HOLLY,
J. D. WARREN.